(12) United States Patent
Sawamoto et al.

(10) Patent No.: US 10,305,143 B2
(45) Date of Patent: May 28, 2019

(54) POLYMER-ION-PERMEABLE MEMBRANE, COMPOSITE-ION-PERMEABLE MEMBRANE, BATTERY ELECTROLYTE MEMBRANE, AND ELECTRODE COMPOSITE

(71) Applicant: Toray Industries, Inc., Tokyo (JP)

(72) Inventors: Atsushi Sawamoto, Otsu (JP); Dai Nishimura, Otsu (JP); Akimitsu Tsukuda, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/523,803

(22) PCT Filed: Dec. 9, 2015

(86) PCT No.: PCT/JP2015/084518
§ 371 (c)(1),
(2) Date: May 2, 2017

(87) PCT Pub. No.: WO2016/098660
PCT Pub. Date: Jun. 23, 2016

(65) Prior Publication Data
US 2017/0358817 A1    Dec. 14, 2017

(30) Foreign Application Priority Data
Dec. 15, 2014    (JP) ................. 2014-252680

(51) Int. Cl.
*H01M 10/0565* (2010.01)
*B32B 5/18* (2006.01)
*B32B 27/34* (2006.01)
*C08J 5/18* (2006.01)
*H01B 1/06* (2006.01)
*H01M 2/16* (2006.01)
*H01M 4/13* (2010.01)
*B32B 27/28* (2006.01)
*H01B 1/12* (2006.01)
*H01M 10/42* (2006.01)
*H01M 10/0525* (2010.01)

(52) U.S. Cl.
CPC ........... *H01M 10/0565* (2013.01); *B32B 5/18* (2013.01); *B32B 27/281* (2013.01); *B32B 27/34* (2013.01); *C08J 5/18* (2013.01); *H01B 1/06* (2013.01); *H01B 1/122* (2013.01); *H01M 2/16* (2013.01); *H01M 2/1673* (2013.01); *H01M 2/1686* (2013.01); *H01M 4/13* (2013.01); *H01M 10/4235* (2013.01); *H01M 10/0525* (2013.01); *H01M 2300/0082* (2013.01)

(58) Field of Classification Search
CPC ........... H01M 10/052; H01M 10/0525; H01M 10/0565; H01M 8/1025; H01M 8/103
See application file for complete search history.

(56) References Cited

U.S. PATENT DOCUMENTS

| 5,834,112 A | 11/1998 | Muraoka et al. |
| 2011/0207021 A1* | 8/2011 | Fujinami ............. H01M 8/1023 429/494 |
| 2012/0208070 A1 | 8/2012 | Nakashima et al. |
| 2014/0120431 A1 | 5/2014 | Roelofs et al. |

FOREIGN PATENT DOCUMENTS

| EP | 1 855 339 | 11/2007 |
| JP | 63-205364 A | 8/1988 |
| JP | 9-302115 A | 11/1997 |
| JP | 2004-363048 A | 12/2004 |
| JP | 2007-103145 A | 4/2007 |
| JP | 2007204518 * | 8/2007 |
| JP | 2008-159496 A | 7/2008 |
| JP | 2011-65984 A | 3/2011 |
| JP | 2014-13772 A | 1/2014 |
| JP | 2014-525115 A | 9/2014 |
| WO | 95/31499 A1 | 11/1995 |

OTHER PUBLICATIONS

Feuillade, G. et al., "Ion-conductive macromolecular gels and membranes for solid lithium cells", *J. Appl. Electrochem.*, 1975, vol. 5, pp. 63-69, Abstract only.

Wright, P. V., "Electrical conductivity in ionic complexes of poly-(ethylene oxide)", *Br. Polm. J.*, 1975, vol. 7. pp. 319-327, Abstract only.

Beuhler, A. J. et al., "Moisture and Purity in Polyimide Coatings", *Mat. Res. Soc. Symp. Proc.*, 1989, vol. 154, pp. 73-90, Abstract only.

Çakir, M. et al., "Phosphorus-Containing Sulfonated Polyimides for Proton Exchange Membranes", *Macromolecular Chemistry and Physics*, 2008, vol. 209, pp. 919-929, Abstract only.

Supplementary European Search Report dated May 3, 2018, of corresponding European Application No. 15869865.4.

* cited by examiner

*Primary Examiner* — Olatunji A Godo
(74) *Attorney, Agent, or Firm* — DLA Piper LLP (US)

(57) ABSTRACT

An ion-permeable membrane is substantially free of holes and has excellent ion permeability, heat resistance, strength, and flexibility, and can form a battery electrolyte membrane that uses the ion-permeable membrane, and an electrode composite. The polymer-ion-permeable membrane has a per-unit-thickness puncture strength of 0.3-3.0 N/μm and a membrane resistance of 3.0-100.0 Ω·cm² at 25° C.

9 Claims, No Drawings

POLYMER-ION-PERMEABLE MEMBRANE, COMPOSITE-ION-PERMEABLE MEMBRANE, BATTERY ELECTROLYTE MEMBRANE, AND ELECTRODE COMPOSITE

TECHNICAL FIELD

This disclosure relates to a polymer-ion-permeable membrane and, particularly, to a polymer-ion-permeable membrane which can be suitably used as a battery separator.

BACKGROUND

Generally, in a nonaqueous electrolyte based battery, a separator is composed of a porous membrane or nonwoven fabric having through-pores with a pore size of about several tens nm to several μm to prevent occurrence of a short circuit due to contact between positive and negative electrodes while enabling ion-conduction between positive and negative electrodes. However, use of a separator having pores causes problems such as occurrence of a short circuit due to growth of a dendrite and ingress of foreign matter, vulnerability to deformation such as bending or compression, and difficulty of attainment of both thickness reduction and strength maintenance.

Examples of the solution to these problems include solid electrolytes, which are classified broadly into inorganic solid electrolytes and organic solid electrolytes. The organic solid electrolytes are classified into polymer gel electrolytes and polymer solid electrolytes (intrinsic polyelectrolytes).

An inorganic solid electrolyte includes anionic lattice points and metal ions, and many inorganic electrolytes having a practical ion-conductivity have been reported (e.g. Japanese Patent Laid-open Publication No. 2014-13772). Those inorganic solid electrolytes have the advantage that they are incombustible and have high safety, and also have a wide potential window. On the other hand, those inorganic solid electrolytes are difficult to put into practical use because of the following disadvantages specific to inorganic solids, i.e. they easily suffer brittle fracture, and thus cannot follow a volume change of an electrode; and they cannot form a favorable interface with an electrode that is an aggregate of particles.

The organic solid electrolytes include polymer gel electrolytes obtained by making an electrolyte solution semi-solid with a polymer. Application of such polymer gel electrolytes to batteries was first reported by Feuillade et al. in 1975 (G. Feuillade, Ph. Perche, J. Appl. Electrochem., 5, 63 (1975)). Since then, various reports have been made (e.g. Japanese Patent Laid-open Publication No. 2008-159496) to date, and the polymer gel electrolytes have been put into practical use in lithium polymer batteries. However, those gel electrolytes are poor in substantial strength in batteries and, therefore, in most cases, a porous membrane has been used in combination for avoiding contact between positive and negative electrodes.

Studies on a polymer solid electrolyte were first reported in a paper by Wright published in 1973 (P. V. Wright, Br. Polm. J., 7. 319 (1975)) and, to date, many results have been reported mainly on polyether-based solid electrolytes (e.g. Japanese Patent Laid-open Publication No. 2007-103145). However, those polymer solid electrolytes still have lower conductivity as compared to electrolyte solutions, and are required to be further improved for practical use. Since the ion-conductivity is closely related to the segment motion of a polymer, studies have been conducted mainly on polymers having a low glass transition temperature due to softening, branching and molecular weight reduction of a polymer structure. On the other hand, however, those polymers also have a reduced elastic modulus and reduced heat resistance, resulting in impairment of a function of suppressing contact between positive and negative electrodes as in the case of gel electrolytes.

As described above, polymers having a high elastic modulus, high strength and heat resistance when formed into a membrane generally have a rigid polymer structure and, therefore, are considered unable to exhibit a high ion-conductivity, and thus have been rarely studied to date.

Films formed of an aromatic polymer, typically an aromatic polyamide (aramid), an aromatic polyimide or the like, are excellent in mechanical properties such as an elastic modulus and strength, and heat resistance and are, therefore, used in various applications such as magnetic recording media and circuit boards.

International Publication No. WO 95/31499 discloses an ion-conductive film obtained using an aromatic polyamide, and according to that document, a swollen gel is obtained by a method including substituting a contained solvent (or contained washing water) and an electrolyte solution in a film production process while using a rigid polymer that is impermeable to the electrolyte solution after the polymer is formed into a film. Japanese Patent Laid-open Publication No. H09-302115 discloses a composite membrane in which voids in an aromatic polyamide porous membrane are filled with a polymer solid electrolyte. The membrane is intended to solve problems associated with a porous membrane, i.e. a short circuit and vulnerability to deformation, and problems associated with a polymer solid electrolyte, i.e. low mechanical strength and heat resistance.

However, in the production method described in International Publication No. WO 95/31499, it is impossible to perform a heat treatment, and it is difficult to obtain a film having dimensional stability at a high temperature. In addition, in a nonaqueous electrolyte based battery such as a lithium ion battery, the amount of water in the battery is controlled in a ppm order and, therefore, practical use of this method involves many challenges.

In Japanese Patent Laid-open Publication No. H09-302115, sufficient mechanical strength and a practical ion-conductivity are not attained. Further, a polymer solid electrolyte in pores does not have high-temperature stability and, therefore, high heat resistance is not achieved.

As described above, an ion-permeable membrane having high heat resistance, strength and flexibility, and practical ion permeability has not been reported.

It could therefore be helpful to provide an ion-permeable membrane excellent in heat resistance, strength, flexibility and ion permeability, a battery electrolyte membrane obtained using the ion-permeable membrane, and an electrode composite.

SUMMARY

We thus provide:

(1) A polymer-ion-permeable membrane which has a puncture strength of 0.3 to 3.0 N/μm per unit thickness, and a membrane resistance of 3.0 to 100.0 $\Omega \cdot cm^2$ at 25° C.

(2) The polymer-ion-permeable membrane according to (1), which has a 5%-elongation stress of 40 to 1,000 MPa in each of a machine direction (MD) and a transverse direction (TD), and a fracture elongation of 5 to 200% in each of the machine direction (MD) and the transverse direction (TD).

(3) The polymer-ion-permeable membrane according to (1) or (2), which has a thermal shrinkage ratio of −2.0 to 10.0% at 150° C. in each of the machine direction (MD) and the transverse direction (TD).

(4) The polymer-ion-permeable membrane according to any one of (1) to (3), which includes a polymer containing a site with an affinity of −80 to −50 kcal/mol and a site with an affinity of −45 to −20 kcal/mol to lithium ions in terms of a free energy ΔG.

(5) The polymer-ion-permeable membrane according to any one of (1) to (4), which includes a polymer containing an aromatic polyamide, an aromatic polyimide or an aromatic polyamideimide having an ether bond or a thioether bond at a main chain or a side chain.

(6) The polymer-ion-permeable membrane according to any one of (1) to (5), which includes a polymer containing a polymer having a structure of any one of the following chemical formulae (I) to (III):

chemical formula (I):

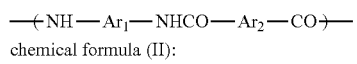
(I)

chemical formula (II):

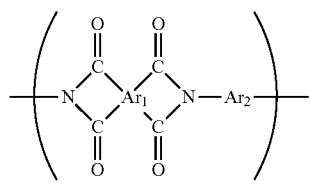
(II)

chemical formula (III):

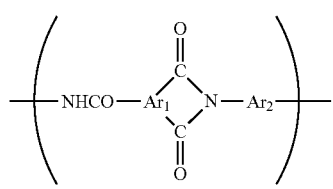
(III)

wherein 25 to 100 mol % of the total of all of the groups of $Ar_1$ and $Ar_2$ in the chemical formulae (I) to (III) is constituted by at least one selected from groups represented by the following chemical formulae (IV) to (VI):
chemical formulae (IV) to (VI):

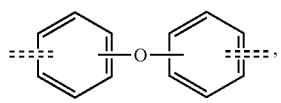
(IV)

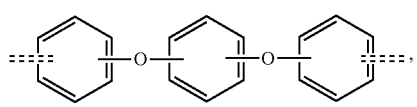
(V)

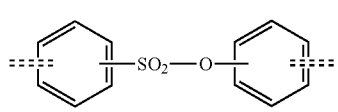
(VI)

wherein the double broken line in the chemical formulae (IV) to (VI) represents one or two bond(s).

(7) A composite-ion-permeable membrane in which the polymer-ion-permeable membrane according to any one of (1) to (6) is formed on a base material having pores.

(8) A battery electrolyte membrane which is obtained using the polymer-ion-permeable membrane according to any one of (1) to (6), or the composite-ion-permeable membrane according to (7).

(9) An electrode composite in which the polymer-ion-permeable membrane according to any one of (1) to (6) is formed on a battery electrode.

A polymer-ion-permeable membrane has substantially no pores, and includes a polymer containing an ion-conductive site. Accordingly, the polymer-ion-permeable membrane is excellent in heat resistance, strength, flexibility and ion permeability. Therefore, the polymer-ion-permeable membrane can be suitably used as a battery electrolyte membrane or the like. When the polymer-ion-permeable membrane is used as a battery electrolyte membrane, high properties are attained as properties of a battery because the electrolyte membrane is excellent in safety in respect to heat resistance, deformation/impact resistance, resistance to a short circuit caused by a dendrite and so on, has low resistance, and can be thinned.

Preferably, a polymer-ion-permeable membrane includes a polymer containing a site with an affinity of −80 to −50 kcal/mol and a site with an affinity of −45 to −20 kcal/mol to lithium ions in terms of a free energy ΔG. When the polymer-ion-permeable membrane includes such sites, ions can be dissolved by controlling the polarity of the polymer, and transported. Accordingly, the polymer-ion-permeable membrane can be made to have all of strength and heat resistance and excellent permeability. The free energy ΔG can be calculated by a method as described later.

A polymer having an aromatic ring on a main chain is suitable as a polymer having all of heat resistance, strength and flexibility. Examples of the above-mentioned polymer include aromatic polyamides (aramids), aromatic polyimides, aromatic polyamideimides, aromatic polyether ketones, aromatic polyether ether ketones, aromatic polyarylates, aromatic polysulfones, aromatic polyether sulfones, aromatic polyether imides and aromatic polycarbonates. A blend of a plurality of polymers may be employed. In particular, the membrane preferably contains 30 to 100% by mass of an aromatic polyamide (including an aromatic polyamide acid being an aromatic polyimide precursor), an aromatic polyimide or an aromatic polyamideimide based on the total of the membrane to attain excellent heat resistance, and easily maintain high strength in reduction of the thickness. The content of the aromatic polyamide, aromatic polyimide or aromatic polyamideimide is more preferably 50 to 100% by mass.

Preferably, the membrane includes a polymer containing a polymer having any one of structures of chemical formulae (I) to (III) as a polymer that can be suitably used. The aromatic polyamide may be one having a repeating unit represented by chemical formula (I), the aromatic polyimide may be one having a repeating unit represented by chemical formula (II), and the aromatic polyamideimide may be one having a repeating unit represented by chemical formula (III).

chemical formula (I):

(I)

chemical formula (II):

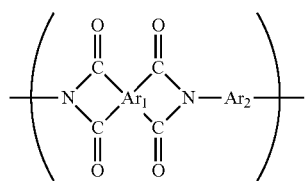

(II)

chemical formula (III):

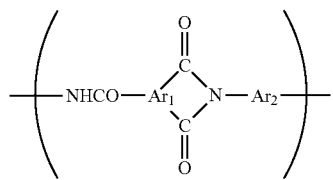

(III)

Each of $Ar_1$ and $Ar_2$ in the chemical formulae (I) to (III) is an aromatic group, and may be a single group, or a plurality of groups, which constitute a copolymer of multiple components. The bonds forming a main chain on an aromatic ring may be meta-oriented, or para-oriented. Some of hydrogen atoms on the aromatic ring may be replaced by any group.

Examples of the means for attaining all of strength, heat resistance and excellent permeability include a method in which ions are dissolved by controlling the polarity of a polymer, and transported. Preferably, the aromatic polyamide, aromatic polyimide or aromatic polyamideimide usable in this method has in a polymer structure a site (strong-affinity site) with an affinity of −80 to −50 kcal/mol and a site (medium-affinity site) with an affinity of −45 to −20 kcal/mol to lithium ions in terms of a free energy ΔG. The free energy ΔG can be calculated by molecular dynamics calculation. As a molecular dynamics calculation method, the method described in M. P. Allen, D. J. Tildesley, Computer Simulation of Liquids, 1989, Oxford University Press (ISBN 0-19-855645-4) can be used. When the polymer has a strong-affinity site, ions can be dissolved in the membrane, and when the polymer also has a medium-affinity site, the dissolved ions can be transported. When the affinity of the strong-affinity site is stronger than an affinity of −80 kcal/mol (the value is smaller than −80 kcal/mol), it may be unable to achieve sufficient permeability because ions are confined. When the affinity of the strong-affinity site is weaker than an affinity of −50 kcal/mol (the value is larger than −50 kcal/mol), it may be unable to achieve sufficient permeability because ions cannot be dissolved. When the affinity of the medium-affinity site is weaker than an affinity of −20 kcal/mol (the value is larger than −20 kcal/mol), it may be unable to achieve ion permeability because there is a shortage of sites involved in transportation of ions in the membrane. The molar ratio of the strong-affinity site and the medium-affinity site ((strong-affinity site/medium-affinity site) ratio) is especially preferably 0.5 to 2.5 from the viewpoint of a balance between dissolution and transportation of ions.

When an aromatic polyamide, an aromatic polyimide or an aromatic polyamideimide is used, such a polymer has a carbonyl group in the structure and, generally, this group often provides a strong-affinity site. Therefore, it is preferred that as a medium-affinity site, an ether bond or a thioether bond exist at a main chain or a side chain (in a main chain or on a side chain). More preferably, an ether bond exists in the main chain, or at least one of a carboxylic acid group, a carboxylate group, a sulfonic acid group, a sulfonate group, an alkoxy group and a cyanate group exists as a substituent on an aromatic ring. Still more preferably, 25 to 100 mol %, more preferably 50 to 100 mol %, of the total of all of the groups of $Ar_1$ and $Ar_2$ in the chemical formulae (I) to (III) is constituted of at least one selected from groups represented by chemical formulae (IV) to (VI):

Chemical Formulae (IV) to (VI):

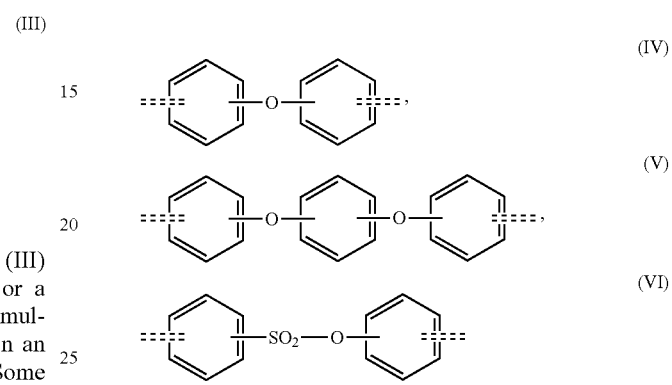

wherein the double broken line in the chemical formulae (IV) to (VI) represents one or two bond(s).

Some of hydrogen atoms on the aromatic ring in the chemical formulae (IV) to (VI) may be replaced by any group such as a halogen group such as fluorine, bromine or chlorine; a nitro group; a cyano group; an alkyl group such as methyl, ethyl or propyl; an alkoxy group such as methoxy, ethoxy or propoxy; or a carboxylic acid group.

The thickness of the polymer-ion-permeable membrane is preferably 0.01 to 30 μm, more preferably 0.05 to 10 μm. The thickness of the polymer-ion-permeable membrane is still more preferably 0.10 to 5 μm. When the thickness is less than 0.01 μm, the membrane may have low strength, and thus fail to achieve the purpose as the polymer-ion-permeable membrane. For example, in use of the polymer-ion-permeable membrane as a battery electrolyte membrane, it may be unable to obtain effects such as deformation/impact resistance, resistance to a short circuit caused by a dendrite and so on. When the thickness is more than 30 μm, the membrane may have low ion permeability, leading to a reduction in power due to an increase in resistance in use of the polymer-ion-permeable membrane as a battery electrolyte membrane. The thickness of the polymer-ion-permeable membrane can be controlled by various conditions including a membrane forming solution concentration, a membrane forming solution viscosity, additives in the membrane forming solution, a casting thickness, a heat treatment temperature and a stretching condition.

Preferably, the polymer-ion-permeable membrane has substantially no pores. As an indication of this, a porosity calculated from $(1-d_1/d_0) \times 100$ is preferably 0 to 10% where $d_0$ is a true specific gravity of a membrane component, and $d_1$ is a bulk density of the membrane. The porosity is more preferably 0 to 5%. When the polymer-ion-permeable membrane has substantially no pores, the membrane has strength that would be difficult to attain with a porous membrane, and infiltration of a metal dendrite or the like is blocked so that when the membrane is used as a battery electrolyte membrane, effects such as deformation/impact resistance and resistance to a short circuit caused by a dendrite are obtained even when the thickness is reduced. When the porosity defined as described above is more than 10%, strength and short circuit resistance may be reduced. Preferably, production conditions for the ion-permeable membrane are each set within a range as described later to ensure that the porosity is within the above-mentioned range.

Preferably, the polymer-ion-permeable membrane has substantially no gas permeability, and its Gurley gas permeability is preferably 10,000 seconds/100 ml or more. When the Gurley gas permeability is less than 10,000 seconds/100 ml, physical through-pores exist and, therefore, it may be unable to obtain the effect of blocking infiltration of a metal dendrite or the like. In addition, the strength may fail to fall within a defined range. Preferably, production conditions for the ion-permeable membrane are each set within a range as described later to ensure that the Gurley gas permeability is within the above-mentioned range.

The polymer-ion-permeable membrane has ion permeability, and the permeation mechanism thereof may be single ion-conduction in which ions singly pass through the membrane, or in-liquid ion-conduction in which ions solvated with an aqueous solution or an organic solvent pass through the membrane. The term "having ion permeability" means that the membrane contains ion permeation channels (ion affinity sites in a polymer structure in the case of the polymer-ion-permeable membrane), and thus ions can pass through the membrane in the thickness direction of the membrane. The index of ion permeability may be an ion-conductivity, a membrane resistance or the like. The membrane resistance of the polymer-ion-permeable membrane at 25° C. is preferably within a range as described later. Preferably, the structure and the molecular weight of the polymer in the ion-permeable membrane, the heat treatment temperature and so on are each set within a range as described in this specification to attain ion permeability. More preferably, a doping treatment as described later is performed. Examples of the permeating ion species include ions of metal elements belonging to Group 1 or Group 2, and specific examples thereof include lithium ions, sodium ions, potassium ions, beryllium ions, magnesium ions and calcium ions.

The polymer-ion-permeable membrane has a membrane resistance of 3.0 to 100.0 $\Omega \cdot cm^2$ at 25° C. The membrane resistance at 25° C. is preferably 3.0 to 50.0 $\Omega \cdot cm^2$, more preferably 3.0 to 20.0 $\Omega \cdot cm^2$. When the membrane resistance is within the above-mentioned range, high ion permeability, and an excellent power characteristic and cycle characteristics are attained in use of the polymer-ion-permeable membrane as a battery electrolyte membrane. When the membrane resistance is more than 100.0 $\Omega \cdot cm^2$, the membrane has low ion permeability so that the power characteristic is reduced, or the capacity is considerably deteriorated in repeated use of the membrane when the membrane is used as a battery electrolyte membrane. Preferably, the structure and the molecular weight of the polymer in the ion-permeable membrane, the heat treatment temperature, the stretching condition and so on are each set within a range as described in this specification to ensure that the membrane resistance is within the above-mentioned range. More preferably, a doping treatment as described later is performed.

Preferably, the polymer-ion-permeable membrane has a 5%-elongation stress (F5 value) of 40 to 1,000 MPa in each of a machine direction (MD) and a transverse direction (TD). The MD is a membrane forming direction, and the TD is a direction orthogonally crossing the MD. When the 5%-elongation stress is less than 40 MPa, productivity in membrane forming and processing processes may be deteriorated. In reduction of the thickness, the membrane may have poor stiffness, leading to deterioration of handling characteristics. Further, in use of the polymer-ion-permeable membrane as a battery electrolyte membrane, insulation quality between positive and negative electrodes may be no longer maintained when a compressive force, bending stress, impact or the like is applied to a battery. The 5%-elongation stress is more preferably 80 to 1,000 MPa in each of the directions, still more preferably 100 to 1,000 MPa in each of the directions. Preferably, a polymer having the foregoing molecular structure is used, and production conditions for the ion-permeable membrane are each set within a range as described later to ensure that the 5%-elongation stress is within the above-mentioned range.

Preferably, the polymer-ion-permeable membrane has a fracture elongation of 5 to 200% in each of the machine direction (MD) and the transverse direction (TD). When the fracture elongation is less than 5%, productivity may be deteriorated due to breakage in membrane forming and processing processes. In use of the polymer-ion-permeable membrane as a battery electrolyte membrane, insulation quality between positive and negative electrodes may be no longer maintained when a compressive force, bending stress, impact or the like is applied to a battery. The fracture elongation is more preferably 10 to 200% in each of the directions, still more preferably 20 to 200% in each of the directions. Preferably, a polymer having the foregoing molecular structure is used, and production conditions for the ion-permeable membrane are each set within a range as described later to ensure that the fracture elongation is within the above-mentioned range.

The polymer-ion-permeable membrane has a puncture strength of 0.3 to 3.0 N/μm per unit thickness. When the puncture strength is less than 0.3 N/μm, a short circuit may occur between positive and negative electrodes due to irregularity of an electrode surface, ingress of impurities, precipitation of a metal dendrite or the like. The puncture strength is preferably 0.8 to 3.0 N/μm, more preferably 1.2 to 3.0 N/μm. Preferably, a polymer having the foregoing molecular structure is used, and production conditions for the ion-permeable membrane are each set within a range as described later to ensure that the puncture strength is within the above-mentioned range.

Preferably, the polymer-ion-permeable membrane has a thermal shrinkage ratio of −2.0 to 10.0% at 150° C. in each of the machine direction (MD) and the transverse direction (TD). The thermal shrinkage ratio is more preferably −2.0 to 5.0% in each of the directions. The thermal shrinkage ratio is still more preferably −2.0 to 2.0% in each of the directions. When the thermal shrinkage ratio in any of the MD and the TD exceeds the above-mentioned range, a short circuit may occur at the end of a battery due to a dimension change of the membrane during generation of heat in the battery in use of the polymer-ion-permeable membrane as a battery electrolyte membrane. Preferably, a polymer having the foregoing molecular structure is used, and production conditions for the ion-permeable membrane are each set within a range as described later to ensure that the thermal shrinkage ratio is within the above-mentioned range.

Preferably, the polymer-ion-permeable membrane has a thermal shrinkage ratio of −2.0 to 20.0% at 200° C. in each of the machine direction (MD) and the transverse direction (TD). The thermal shrinkage ratio is more preferably −2.0 to 10.0% in each of the directions. The thermal shrinkage ratio is still more preferably −2.0 to 5.0% in each of the directions. When the thermal shrinkage ratio in any of the MD and the TD exceeds the above-mentioned range, a short circuit may occur at the end of a battery due to a dimension change of the membrane when a battery including the polymer-ion-permeable membrane as a battery electrolyte membrane abnormally generates heat with some cause. Preferably, a polymer having the foregoing molecular structure is used, and production conditions for the ion-permeable membrane are each set within a range as described later to ensure that the thermal shrinkage ratio is within the above-mentioned range. A negative value in the thermal shrinkage ratio means thermal expansion.

A method of producing the polymer-ion-permeable membrane will now be described below.

First, a method of obtaining a polymer usable in the polymer-ion-permeable membrane will be described with an aromatic polyamide and an aromatic polyimide as examples. Of course, the polymer and the method of polymerization thereof are not limited to those described below.

To obtain an aromatic polyamide, various methods can be used and, for example, in using a low-temperature solution polymerization method with an acid dichloride and a diamine as raw materials, the aromatic polyamide is synthesized in an aprotic organic polar solvent such as N-methylpyrrolidone, N,N-dimethylacetamide, dimethylformamide or dimethyl sulfoxide. In solution polymerization, the water content of a solvent to be used in the polymerization is preferably 500 ppm or less (mass basis; the same applies hereinafter), more preferably 200 ppm or less to obtain a polymer having a high molecular weight. A metal salt may be added for the purpose of accelerating dissolution of the polymer. The metal salt is preferably a halide of an alkali metal or an alkali earth metal, which is soluble in an aprotic organic polar solvent, and examples thereof include lithium chloride, lithium bromide, sodium chloride, sodium bromide, potassium chloride and potassium bromide. When the amounts of an acid dichloride and a diamine used are equal to each other, a polymer having an extremely high molecular weight may be generated and, therefore, it is preferred to adjust the molar ratio so that the ratio of one of the acid dichloride and the diamine to the other is 95.0 to 99.5 mol %. The polymerization reaction of the aromatic polyamide is accompanied by generation of heat, and when the temperature of the polymerization system increases, it may be unable to sufficiently increase the polymerization degree because of occurrence of a side reaction. Therefore, it is preferred to cool the solution during polymerization to 40° C. or lower. When an acid dichloride and a diamine are used as raw materials, hydrogen chloride is produced as a by-product as the polymerization reaction proceeds, and for neutralizing the hydrogen chloride, an inorganic neutralizer such as lithium carbonate, calcium carbonate or calcium hydroxide, or an organic neutralizer such as ethylene oxide, propylene oxide, ammonia, triethylamine, triethanolamine or diethanolamine may be used.

When an aromatic polyimide or a polyamide acid being a precursor of the aromatic polyimide is polymerized using, for example, a tetracarboxylic anhydride and an aromatic diamine as raw materials, a method can be employed in which the aromatic polyimide or the polyamide acid is synthesized by solution polymerization in an aprotic organic polar solvent such as N-methyl-2-pyrrolidone, N,N-dimethylacetamide, dimethylformamide or dimethyl sulfoxide. When the amounts of the tetracarboxylic anhydride and the aromatic diamine used as raw materials are equal to each other, a polymer having an extremely high molecular weight may be generated and, therefore, it is preferred to adjust the molar ratio so that the ratio of one of the tetracarboxylic anhydride and the aromatic diamine to the other is 90.0 to 99.5 mol %. The polymerization reaction is accompanied by generation of heat, and when the temperature of the polymerization system increases, precipitation may occur due to an imidization reaction and, therefore, the temperature of the solution during polymerization is preferably 70° C. or lower. As a method of imidizing the thus-synthesized aromatic polyamide acid to obtain an aromatic polyimide, a heat treatment, a chemical treatment, a combination thereof, or the like is used. The heat treatment method is generally a method in which a polyamide acid is heat-treated at 100 to 500° C. to imidize the polyamide acid. Examples of the chemical treatment include a method using a dehydrating agent such as an aliphatic acid anhydride or an aromatic acid anhydride while using as a catalyst a tertiary amine such as triethylamine, and a method using an imidization agent such as pyridine.

The logarithmic viscosity (ηinh) of each of the aromatic polyamide and the aromatic polyimide, or the polyamide acid being a precursor thereof is preferably 0.5 to 7.0 dl/g. When the logarithmic viscosity is less than 0.5 dl/g, the binding strength between chains in entwinement of polymer molecular chains is reduced so that mechanical properties such as stiffness and strength may be deteriorated, or the thermal shrinkage ratio may increase. When the logarithmic viscosity is more than 7.0 dl/g, ion permeability may be reduced.

A membrane forming solution to be used in the process of producing the polymer-ion-permeable membrane (hereinafter, referred to simply as a membrane forming solution) will now be described.

As the membrane forming solution, a polymer solution after polymerization may be used as it is, or a solution obtained by once isolating a polymer, and then redissolving the polymer in an aprotic organic polar solvent or an inorganic solvent such as sulfuric acid may be used. The method of isolating a polymer is not particularly limited, and examples thereof include a method in which a polymer solution after polymerization is added in a large amount of water to extract a solvent and a neutralized salt, and only the precipitated polymer is separated, and then dried. A metal salt may be added as dissolution aid during dissolution. The metal salt is preferably a halide of an alkali metal or an alkali earth metal, which is soluble in an aprotic organic polar solvent, and examples thereof include lithium chloride, lithium bromide, sodium chloride, sodium bromide, potassium chloride and potassium bromide.

The concentration of the polymer in the membrane forming solution is preferably 3 to 30% by mass, more preferably 5 to 20% by mass. To the membrane forming solution may be added inorganic particles or organic particles for the purpose of, for example, increasing the strength, heat resistance and ion permeability and reducing the static friction coefficient of the resulting ion-permeable membrane. Examples of the inorganic particles include those of wet and dry silica, colloidal silica, aluminum silicate, titanium oxide, calcium carbonate, calcium phosphate, barium sulfate, alumina, aluminum hydroxide, magnesium hydroxide, magnesium carbonate, zinc carbonate, titanium oxide, zinc oxide (zinc flower), antimony oxide, cerium oxide, zirconium oxide, tin oxide, lanthanum oxide, magnesium oxide, barium carbonate, zinc carbonate, basic lead carbonate (lead white), barium sulfate, calcium sulfate, lead sulfate, zinc sulfide, mica, mica titanium, talc, clay, kaolin, lithium fluoride and calcium fluoride. Examples of the organic particles include polymer crosslinked particles. Examples of the crosslinked particles include crosslinked particles of polymethoxysilane-based compounds, crosslinked particles of polystyrene-based compounds, crosslinked particles of acryl-based compounds, crosslinked particles of polyurethane-based compounds, crosslinked particles of polyester-based compounds, crosslinked particles of fluorine-based compounds, and mixtures thereof.

A method of forming the polymer-ion-permeable membrane will now be described. The membrane forming solution prepared in the manner described above can be formed into a membrane by a so-called solution membrane formation method. Examples of the solution membrane formation method include a dry-wet method, a dry method and a wet method, and the membrane may be formed by any of the methods, but a dry-wet method will be described here as an example. The polymer-ion-permeable membrane may be formed as a laminated composite by directly forming the membrane on a base material having pores, or on an electrode, but a method of forming the membrane as a single film will be described here.

When the membrane is formed by a dry-wet method, a membrane forming solution is extruded from a mouthpiece onto a support such as a drum, an endless belt or a film to obtain a membrane-like article, and the membrane-like article is then dried until it has self-retainability. Drying can be performed under the condition of 60 to 220° C. and 60 minutes or less. When a membrane formed of a polyamide acid is to be obtained using a polyamide acid polymer without imidizing the polyamide acid polymer, the drying temperature is preferably 60 to 150° C. The drying temperature is more preferably 60 to 120° C. The film after the dry process is separated from the support, introduced to a wet process, subjected to desalting, solvent removal and the like, and stretched, dried and heat-treated. In the stretching, the stretch ratio is preferably 0.8 to 8.0, more preferably 1.0 to 5.0 in terms of a planar ratio (the planar ratio is defined as a value obtained by dividing a film area after stretching by a film area before stretching; a planar ratio of 1 or less means relaxation). The heat treatment is performed at a temperature of 80° C. to 500° C., preferably 150° C. to 400° C. for several seconds to several tens minutes. When a membrane formed of a polyamide acid is to be obtained using a polyamide acid polymer without imidizing the polyamide acid polymer, the heat treatment temperature is preferably 80 to 150° C. More preferably, the heat treatment temperature is 80 to 120° C. under reduced pressure.

Preferably, the film obtained by the foregoing method is then subjected to a doping treatment to exhibit ion permeability. The doping treatment is a treatment to achieve higher ion permeability and reduce an initial irreversible capacity by doping the membrane beforehand with ions to be conducted. Examples of the doping treatment method include a method in which a potential difference is produced while a metal foil (lithium metal foil in the case of a lithium ion battery) corresponding to a metal ion species to be given conductivity and an ion-permeable membrane are in contact with each other so that metal ions are inserted into the membrane from the metal foil. Specifically, the doping treatment can be performed by preparing a laminate of a metal foil, an ion-permeable membrane and an Al foil, and connecting the metal foil and the Al foil to each other by a lead. The laminate may be annealed at 40 to 100° C. When the membrane is applied to a liquid-based battery, a doping treatment effect can be obtained not only by the foregoing method using a metal foil, but also by immersing the ion-permeable membrane in an electrolyte solution with a metal ion-containing electrolyte dissolved therein, and annealing the ion-permeable membrane at 40 to 100° C. for 10 minutes to 24 hours. The dope treatment may be performed before integration of the ion-permeable membrane into a battery, or performed by subjecting a completed battery to charge-discharge and annealing after integration of the ion-permeable membrane into the battery.

The polymer-ion-permeable membrane may be used singly as a battery electrolyte membrane (or separator), or laminated with a base material having pores, and used. Examples of the base material having pores include polymer porous membranes that are generally used as a separator, and nonwoven fabrics. As a method of lamination, a base material having pores and the polymer ion-permeable membrane may be sequentially laminated in assembly of a battery, or the polymer-ion-permeable membrane may be formed beforehand on a base material having pores to obtain an integrated composite-ion-permeable membrane. The polymer-ion-permeable membrane may be formed on a battery electrode by direct application to obtain an integrated electrode/ion-permeable membrane composite.

The polymer-ion-permeable membrane is excellent in heat resistance, strength and flexibility, and exhibits ion permeability although it has substantially no pores. Therefore, the polymer-ion-permeable membrane can be suitably used as a battery electrolyte membrane. When the polymer-ion-permeable membrane is used as a battery electrolyte membrane, it may be used as a separator to be disposed between positive and negative electrodes together with an electrolyte solution, or may be used as a solid electrolyte membrane. When an ion-permeable membrane sample is taken out from a battery used together with an electrolyte solution, and the thickness, the Gurley gas permeability, various kinds of mechanical properties, the thermal shrinkage ratio and so on are evaluated, it is preferred to perform the evaluation for the sample from which the electrolyte solution is removed beforehand. Examples of the method of removing the electrolyte solution include a method in which a sample taken out from a battery is fixed to a predetermined length and width using a metal frame, an electrolyte solution in the sample is sufficiently washed off in a water bath or the like and replaced by water, and the sample is then dried in a vacuum oven at 60 to 120° C. for about 1 to 12 hours.

When the polymer-ion-permeable membrane is used as a battery electrolyte membrane, high properties are attained in respect to heat resistance, deformation/impact resistance, resistance to a short circuit caused by a dendrite and so on. Effects such as prevention of degradation caused by elution of an active material into an electrolyte solution, size reduction of a battery due to thickness reduction, and capacity enhancement of a battery can also be expected.

Examples of battery to which the polymer-ion-permeable membrane is applied include lithium ion secondary batteries (including lithium sulfur batteries and lithium metal batteries), sodium ion secondary batteries, polyvalent ion secondary batteries including, for example, magnesium and calcium ions, but are not limited to these. When the polymer-ion-permeable membrane is applied to the lithium sulfur battery, improvement of coulomb efficiency and cycle characteristics by suppression of elution of polysulfide ions as a reduced product of sulfur can be expected. When the polymer-ion-permeable membrane is applied to the lithium metal battery, an effect of suppressing growth of a dendrite-like metal from the top of a metal negative electrode can be expected.

Batteries including the polymer-ion-permeable membrane as an electrolyte can be suitably used as power sources for small electronic devices as well as transportation systems such as electric vehicles (EVs), hybrid electric vehicles (HEVs) and plug-in hybrid electric vehicles (PHEVs) and large industrial equipment such as industrial cranes. These batteries can also be suitably used as electrical storage devices for leveling of electric power in solar cells, wind turbine generators and so on, and for smart grids. Moreover, these batteries can also be suitably used as batteries to be used under a special environment such as batteries for space use.

EXAMPLES

Methods of Measuring Physical Properties and Methods of Evaluating Effects

Physical properties in examples were measured in accordance with the following methods.

(1) Porosity

A thickness (μm; value measured in (3)) and a mass of a sample were measured, and an apparent density (bulk density) $d_1$ of the sample was determined. A porosity (%) was calculated from the apparent density $d_1$ and a true specific gravity $d_0$ of a sample component using the following equation.

porosity (%)=$(1-d_1/d_0) \times 100$ (2) Free Energy ΔG

An interaction energy with lithium ions was calculated as a free energy ΔG (kcal/mol) by the molecular dynamics calculation method described in M. P. Allen, D. J. Tildesley, Computer Simulation of Liquids, 1989, Oxford University Press (ISBN 0-19-855645-4).

(3) Thickness

A thickness (m) of a sample was measured using a constant-pressure thickness measuring device FFA-1 (manufactured by OZAKI MFG. CO., LTD.). The probe diameter is 5 mm, and the measurement load is 1.25 N.

(4) Gurley Gas Permeability

A Gurley gas permeability (seconds/100 ml) of a sample was measured in accordance with the method specified in JIS-P8117 (1998) using a B-type Gurley densometer (manufactured by Yasuda Seiki Seisakusho LTD.). The sample was fastened into a circular hole having a diameter of 28.6 mm and an area of 642 mm², air in a cylinder was forced from a test circular hole portion to the outside of the cylinder by an inner cylinder (mass of inner cylinder: 567 g), and a time for passage of 100 ml of air was measured, and defined as a Gurley gas permeability.

We determined that the sample had substantially no gas permeability when the Gurley gas permeability was 10,000 seconds/100 ml or more.

(5) Membrane Resistance

As an electrode 1 for measurement (defined as a positive electrode), a 20 μm-thick aluminum sheet was cut to a size of 50 mm (long side)×40 mm (short side). Of this size, a size of 40 mm (short side)×10 mm (end of long side) corresponds to an overlap width for connecting a tab, and thus the effective measurement area is 40 mm×40 mm (1,600 mm²=16 cm²). An aluminum tab having a width of 5 mm, a length of 30 mm and a thickness of 100 μm was ultrasonically welded to the cut aluminum sheet at any position on the overlap width portion, and the whole of the overlap width portion including the welded portion was then covered with a KAPTON (registered trademark) tape to perform an insulation treatment.

As an electrode 2 for measurement (defined as a negative electrode), the same aluminum sheet as described above was cut to a size of 55 mm (long side)×45 mm (short side). Of this size, a size of 45 mm (short side)×10 mm (end of long side) corresponds to an overlap width for connecting a tab. An aluminum tab having a width of 5 mm, a length of 30 mm and a thickness of 100 μm was ultrasonically welded to the cut aluminum sheet at any position on the overlap width portion, and the whole of the overlap width portion including the welded portion was then covered with a KAPTON (registered trademark) tape to perform an insulation treatment.

As a doping source, a 20 μm-thick lithium metal foil (manufactured by Honjo Chemical Corporation) was cut to a size of 45 mm×45 mm, and a sample membrane was cut to a size of 55 mm×55 mm. The electrode 1 for measurement, the sample, the lithium metal foil and the electrode 2 for measurement were stacked in this order, and disposed such that the whole of the effective measurement region (40 mm×40 mm) of the electrode 1 for measurement faced the electrode 2 for measurement with the sample membrane existing therebetween. Next, the laminate (electrode/sample/ electrode) was sandwiched between aluminum laminate films, and the aluminum laminate films were heat-sealed on the sides thereof except one side so that a bag-shape film was obtained.

1.5 g of an electrolyte solution obtained by dissolving $LiPF_6$ as a solute in a mixed solvent of ethylene carbonate: diethyl carbonate=3:7 (volume ratio) in a concentration of 1 mol/L was injected into the bag-shaped aluminum laminate film, and the aluminum laminate film was heat-sealed on a short side while the electrolyte solution was impregnated under reduced pressure so that a laminate cell was prepared. In this way, two cells, one of which had two sample membranes between electrodes and the other of which had four sample membranes between electrodes, were prepared.

Each of the prepared cells was left standing in an atmosphere at 50° C. for 12 hours to perform a doping treatment, an alternating-current impedance was measured under the condition of a voltage amplitude of 10 mV and a frequency of 10 Hz to 5,000 kHz in an atmosphere at 25° C., and a membrane resistance (Ω) was determined from a Cole-Cole plot. The obtained membrane resistance was plotted versus the number of sample membranes, the plot was linearly approximated as a straight line passing through the origin, and from the gradient of the straight line, a membrane resistance per one sample membrane was calculated. The obtained membrane resistance was multiplied by the effective measurement area (16 cm²) to calculate a normalized membrane resistance (Ω·cm²). Five cells for evaluation were prepared, cells having the maximum membrane resistance and having the minimum membrane resistance were removed, and an average for the remaining three cells was employed as a test value for each number of sample membranes.

(6) 5%-Elongation Stress and Fracture Elongation

A sample cut to a width of 10 mm and a length of 150 mm (measurement direction) was subjected to a tension test under the condition of a chuck-to-chuck distance of 50 mm, a tension speed of 300 mm/minute, a temperature of 23° C. and a relative humidity of 65% using Robot Tensilon AMF/ RTA-100 (manufactured by ORIENTEC CORPORATION), and a 5%-elongation stress (MPa) and a fracture elongation (%) were determined. Measurement was performed five times in each of the machine direction (MD) and the transverse direction (TD) of the film, and an average of the measured values was determined.

(7) Puncture Strength

Using a compression tester KES-G5 (manufactured by KATO TECH CO., LTD.), measurement was performed at 23° C. in conformity to JIS-Z1707 (1997) except that the needle penetration speed was set to 2 mm/second. A maximum load at the time when a sample was broken was read, and a value obtained by dividing the maximum load by the thickness of the sample before the test was defined as a puncture strength (N/μm). Measurement was performed five times for each sample, and an average of the measured values was determined.

(8) Thermal Shrinkage Ratio

A porous membrane as a sample was cut to a strip shape having a width of 5 mm and a length of 100 mm, and measurement was performed along the long side. A mark was placed at a position about 5 mm away from each of both ends of the long side, and a distance between the marks was set to $L_1$. The sample was clipped at one end outside the mark, suspended in a hot air oven, and heat-treated at a measurement temperature (150° C. or 200° C.) for 10 minutes. The sample was taken out, and cooled to 25° C., a distance $L_2$ between the marks was measured, and a thermal shrinkage ratio (%) was calculated from the following equation. Measurement was performed five times in each of the machine direction (MD) and the transverse direction (TD) of the film, and an average of the measured values was determined.

thermal shrinkage ratio (%)=$((L_1-L_2)/L_1)\times 100$ (9) Logarithmic Viscosity $\eta_{inh}$ A polymer was dissolved in a concentration of 0.5 g/dl in N-methylpyrrolidone (NMP) to which 2.5% by mass of lithium bromide (LiBr) was added, and a flow time for the resulting solution was measured at 30° C. using an Ubbelohde viscometer. A flow time for 2.5 mass % LiBr/NMP as a blank having no dissolved polymer was similarly measured, and a logarithmic viscosity $\eta_{inh}$ (dl/g) was calculated using the following equation.

logarithmic viscosity $\eta_{inh}$ (dl/g)=$[\ln(t/t_0)]/0.5$ $t_0$: flow time (seconds) for blank
t: flow time (seconds) for sample

(10) Battery Evaluation

Preparation of Cell

As a positive electrode, a positive electrode sheet (manufactured by Hohsen Corp.) having a thickness of 40 μm, a charge capacity of 4.00 mAh/cm² and a discharge capacity of 3.64 mAh/cm² and including lithium cobalt oxide (LiCoO₂) as an active material was cut to a size of 50 mm×40 mm. Of this size, a size of 40 mm (short side)×10 mm (a part of long side) corresponds to an uncoated portion for connecting a tab, and thus the size of the active material-coated portion is 40 mm×40 mm. An aluminum positive electrode tab having a width of 5 mm, a length of 30 mm and a thickness of 0.1 mm was ultrasonically welded to the positive electrode uncoated portion.

As a negative electrode, a negative electrode sheet (manufactured by Hohsen Corp.) having a thickness of 50 μm, a charge capacity of 4.17 mAh/cm² and a discharge capacity of 3.65 mAh/cm² and including graphite as an active material was cut to a size of 55 mm×45 mm. Of this size, a size of 45 mm (short side)×10 mm corresponds to an uncoated portion for connecting a tab, and thus the size of the active material-coated portion is 45 mm×45 mm. A copper negative electrode tab having the same size as that of the positive electrode tab was ultrasonically welded to the negative electrode uncoated portion.

A sample membrane was cut to a size of 60 mm×60 mm, and the positive electrode, the sample and the negative electrode were stacked in this order, and disposed such that the whole of the positive electrode-coated portion faced the negative electrode-coated portion with the sample existing therebetween. An electrode group was thus obtained. Next, the laminate (electrode/sample/electrode) was sandwiched between aluminum laminate films, and the aluminum laminate films were heat-sealed on the sides thereof except one side so that a bag-shape film was obtained.

1.5 g of an electrolyte solution prepared by dissolving LiPF₆ as a solute in a mixed solvent of ethylene carbonate: diethyl carbonate=3:7 (volume ratio) in a concentration of 1 mol/L, and adding 2% by mass of vinylene carbonate as an additive was injected into the bag-shaped aluminum laminate film, and the aluminum laminate film was heat-sealed on a short side while the electrolyte solution was impregnated under reduced pressure so that a laminate cell was prepared. The design discharge capacity is 58.24 mAh.

The prepared laminate cell was left standing in an atmosphere at 50° C. for 12 hours to perform a doping treatment, and a test was then conducted in an atmosphere at 25° C. Five cells were prepared, cells having the maximum measurement value and having the minimum measurement value were removed, and an average for the remaining three cells was employed as a test value.

Finishing Charge-Discharge

Constant-current charge was performed at a current value of 0.2 C until the voltage reached 4.2 V, and constant-voltage charge was performed at a voltage of 4.2 V until the current value reached 50 μA. Subsequently, constant-current discharge was performed at a current value of 0.2 C until the voltage reached 2.7 V. The charge/discharge was performed total four times such that charge and discharge occurred alternately. For a cell for which the charge time exceeded 24 hours, the test was stopped at that point, and it was determined that battery evaluation was impossible.

Power Characteristic Test

Constant-current charge was performed at a current value of 0.5 C until the voltage reached 4.2 V. Subsequently, constant-current discharge was performed at a current value of 0.5 C until the voltage reached 2.7 V so that a discharge capacity at 0.5 C was obtained. Subsequently, constant-current charge was performed at 0.5 C for every charge, and constant-current discharge was performed at 1 C, 3 C and 5 C to obtain a discharge capacity at each C rate.

Hereinafter, our membranes and composites will be described more in detail based on examples, but this disclosure is not limited to these examples.

Example 1

4,4'-diaminodiphenyl ether (manufactured by Tokyo Chemical Industry Co., Ltd.) as a diamine was dissolved in dehydrated N-methyl-2-pyrrolidone (NMP; manufactured by Mitsubishi Chemical Corporation) under a nitrogen flow, and the solution was cooled to 30° C. or lower. To the solution was added 2-chloroterephthaloyl chloride (manufactured by Nippon Light Metal Company, Ltd.) in an amount of 99 mol % based on the total amount of the diamine for 30 minutes while the inside system was kept at 30° C. or lower under a nitrogen flow. After the 2-chloroterephthaloyl chloride was fully added, the mixture was stirred for about 2 hours to polymerize an aromatic polyamide (A). The obtained polymerization solution was neutralized with lithium carbonate (manufactured by Honjo Chemical Corporation) in an amount of 97 mol % and diethanolamine (manufactured by Tokyo Chemical Industry Co., Ltd.) in an amount of 6 mol % based on the total amount of the acid chloride. A solution of the aromatic polyamide (A) was thus obtained. The logarithmic viscosity $\eta_{inh}$ of the obtained aromatic polyamide was 2.5 dl/g.

An affinity to lithium ions in terms of a free energy $\Delta G$ in the molecular structure of the obtained aromatic polyamide (A) was calculated, and the result showed that carbonyl oxygen derived from 2-chloroterephthaloyl chloride had an affinity of −60.1 kcal/mol, and ether oxygen derived from 4,4'-diaminodiphenyl ether had an affinity of −40.0 kcal/mol. Other sites had a value larger than −20 kcal/mol.

The obtained aromatic polyamide solution was applied in the form of a membrane onto a stainless steel (SUS 316) belt as a support, and dried at a hot air temperature of 120° C. until the film had self-retainability, and the film was then separated from the support. The film was then introduced into a water bath at 60° C. to extract a solvent, a neutralized salt and so on. After separation and introduction into the water bath, the film is stretched at a ratio of 1.1 in the machine direction (MD), and is not gripped in the transverse direction (TD) of the film. Subsequently, the obtained water-containing film was subjected to a heat treatment for 2 minutes while being stretched at a ratio of 1.15 in the transverse direction (TD) with a fixed length in a tenter chamber at a temperature of 280° C. A 5 µm-thick polymer-ion-permeable membrane sample was thus obtained. The evaluation results for the obtained samples are shown in Tables 1 and 2.

A laminate cell for measurement of membrane resistance was prepared using the obtained polymer-ion-permeable membrane sample. The membrane resistance first measured at 25° C. was 8694 $\Omega \cdot cm^2$ (i.e. low ion permeability), but the membrane resistance measured again at 25° C. after the polymer-ion-permeable membrane was left standing in an atmosphere at 50° C. for 12 hours was 9.9 $\Omega \cdot cm^2$. For evaluation of the membrane resistance and battery evaluation in all of the following examples and comparative examples, measurement was performed in an atmosphere at 25° C. after the polymer-ion-permeable membrane was left standing in an atmosphere at 50° C. for 12 hours.

Battery evaluation was performed using the obtained polymer-ion-permeable membrane sample, and the result showed that the battery had a capacity equivalent to 98% of the design capacity in finishing charge-discharge, and a power characteristic of 95% at 0.5 C, 82% at 1 C and 11% at 3 C. After the battery evaluation, the sample was taken out, washed, and dried, and a Gurley gas permeability was then measured. The result showed that the Gurley gas permeability exceeded 10,000 seconds/100 ml, and thus the sample had substantially no gas permeability.

A 9 µm-thick polyethylene (PE) separator E09HMS (manufactured by Toray Battery Separator Film Co., Ltd.) was used to prepare a battery cell having a cell structure of positive electrode/PE separator/polymer-ion-permeable membrane sample/PE separator/negative electrode. The prepared battery cell was similarly evaluated, and the result showed that the battery had a capacity achievement ratio of 98% in finishing charge-discharge, and a power characteristic of 95% at 0.5 C, 86% at 1 C and 68% at 3 C. Thus, the capacity achievement ratio at a high rate was improved as compared to the polymer-ion-permeable membrane alone.

Example 2

Except that to obtain an aromatic polyamide (B), the diamine was changed to 4,4'-diaminodiphenyl ether in an amount of 50 mol % and 1,4-phenylenediamine (manufactured by Tokyo Chemical Industry Co., Ltd.) in an amount of 50 mol % based on the total amount of the diamine, the same procedure as in Example 1 was carried out to obtain a polymer-ion-permeable membrane sample. The evaluation results for the obtained samples are shown in Tables 1 and 2.

Example 3

Except that to obtain an aromatic polyamide (C), the diamine was changed to 4-aminophenoxy-4-aminobenzenesulfonic acid ester (manufactured by Toray Fine Chemicals Co., Ltd.) in an amount of 100 mol % based on the total amount of the diamine, and the acid chloride was changed to terephthaloyl chloride (manufactured by Tokyo Chemical Industry Co., Ltd.) in an amount of 99 mol % based on the total amount of the diamine, the same procedure as in Example 1 was carried out to obtain a polymer-ion-permeable membrane sample. The evaluation results for the obtained samples are shown in Tables 1 and 2.

Example 4

Except that to obtain an aromatic polyamide (D), the diamine was changed to 1,3-phenylenediamine-4-sulfonic acid (manufactured by Tokyo Chemical Industry Co., Ltd.) in an amount of 100 mol % based on the total amount of the diamine, and the acid chloride was changed to terephthaloyl chloride in an amount of 99 mol % based on the total amount of the diamine, the same procedure as in Example 1 was carried out to obtain a polymer-ion-permeable membrane sample. The evaluation results for the obtained samples are shown in Tables 1 and 2.

Example 5

Except that to obtain an aromatic polyamide (E), the diamine was changed to 1,3-bis(4-aminophenoxy)benzene (manufactured by Tokyo Chemical Industry Co., Ltd.) in an amount of 100 mol % based on the total amount of the diamine, and the acid chloride was changed to terephthaloyl chloride in an amount of 99 mol % based on the total amount of the diamine, the same procedure as in Example 1 was carried out to obtain a polymer-ion-permeable membrane sample. The evaluation results for the obtained samples are shown in Tables 1 and 2.

Example 6

4,4'-diaminodiphenyl ether was dissolved in dehydrated N-methyl-2-pyrrolidone at room temperature. To the solution was added 4,4'-oxydiphthalic anhydride (manufactured by Tokyo Chemical Industry Co., Ltd.) in an amount of 100 mol % based on the total amount of the diamine for 30 minutes. After the 4,4'-oxydiphthalic anhydride was fully added, the mixture was stirred for about 2 hours to polymerize an aromatic polyamide acid (A). The logarithmic viscosity $\eta_{inh}$ of the obtained aromatic polyamide acid was 2.0 dl/g.

The obtained aromatic polyamide acid solution was applied in the form of a membrane onto a stainless steel (SUS 316) plate as a support, and dried in a hot air oven at 60° C. until the film had self-retainability, and the film was then separated from the support. The separated film was then fixed to a metal frame, and introduced into a water bath at 60° C. to extract a solvent. Subsequently, the water-containing film taken out from the water bath was subjected to a heat treatment in a vacuum oven at a temperature of 80° C. for 15 minutes to obtain a 5 µm-thick polymer-ion-perme-

Example 7

The same procedure as in Example 6 was carried out to produce a membrane forming solution containing an aromatic polyamide acid (A).

The obtained aromatic polyamide acid solution was applied in the form of a membrane onto a stainless steel (SUS 316) plate as a support, and dried in a hot air oven at 120° C. until the film had self-retainability, and the film was then separated from the support. The separated film was then fixed to a metal frame, and introduced into a water bath at 60° C. to extract a solvent. Subsequently, the water-containing film taken out from the water bath was subjected to a heat treatment in a hot air oven at a temperature of 350° C. for 2 minutes to perform imidization. A 5 µm-thick polymer-ion-permeable membrane sample formed of an aromatic polyimide (A) was thus obtained. The evaluation results for the obtained samples are shown in Tables 1 and 2.

Example 8

The same procedure as in Example 1 was carried out to produce a solution containing an aromatic polyamide (A).

Next, to the obtained aromatic polyamide solution were added polycarbonate (PC) A2200 (manufactured by Idemitsu Kosan Co., Ltd.) and NMP for dilution, and the mixture was adjusted so that the contents of the aromatic polyamide and the PVP in the membrane forming solution were 8% by mass and 8% by mass, respectively. The membrane forming solution was stirred at 60° C. for 2 hours to be formed into a uniform transparent solution.

Thereafter, the same procedure as in Example 1 was carried out to obtain a polymer-ion-permeable membrane sample. The evaluation results for the obtained samples are shown in Tables 1 and 2.

Example 9

The same procedure as in Example 1 was carried out to produce a solution containing an aromatic polyamide (A).

Next, to the obtained aromatic polyamide solution were added silica particles R972 (manufactured by Nippon Aerosil Co., Ltd.) and NMP for dilution, and the membrane forming solution was adjusted so that the contents of the aromatic polyamide and the silica particles in the membrane forming solution were 8% by mass and 8% by mass, respectively.

Thereafter, the same procedure as in Example 1 was carried out to obtain a polymer-ion-permeable membrane sample. The evaluation results for the obtained samples are shown in Tables 1 and 2.

Example 10

The same procedure as in Example 1 was carried out to produce a solution containing an aromatic polyamide (A).

The obtained aromatic polyamide solution was applied in the form of a membrane onto a 25 µm-thick cellulose sheet MW-25 (manufactured by Miki Tokushu Paper Mfg. Co., Ltd), and dried in a hot air oven at 120° C. to obtain a composite membrane. The composite membrane was then fixed to a metal frame, and introduced into a water bath at 60° C. to extract a solvent. Subsequently, the water-containing composite membrane taken out from the water bath was subjected to a heat treatment in a hot air oven at a temperature of 230° C. for 2 minutes to obtain a composite-ion-permeable membrane sample having a total thickness of 26 µm.

In the obtained composite-ion-permeable membrane sample, only the polymer-ion-permeable membrane had a puncture strength of 1.5 N/µm. The puncture strength (N/µm) per unit thickness of only the polymer-ion-permeable membrane was determined in the following manner: the puncture strength (N) of the cellulose sheet alone was subtracted from the puncture strength (N) of the composite-ion-permeable membrane sample to determine the puncture strength (N) of only the polymer-ion-permeable membrane, and the determined puncture strength (N) was divided by the thickness (1 µm). The puncture strength of the composite-ion-permeable membrane sample was 0.1 N/µm. The porosity shown in Table 1 is a value obtained by measuring the cellulose sheet alone and the composite-ion-permeable membrane sample, and calculating therefrom the porosity of only the polymer-ion-permeable membrane.

Example 11

The same procedure as in Example 1 was carried out to produce a solution containing an aromatic polyamide (A).

Next, to the obtained aromatic polyamide solution were added alumina particles Alu C (manufactured by Nippon Aerosil Co., Ltd.) and NMP for dilution, and the membrane forming solution was adjusted so that the contents of the aromatic polyamide and the alumina particles in the membrane forming solution were 3% by mass and 7% by mass, respectively.

The obtained membrane forming solution was applied in the form of a membrane onto a 20 µm-thick PE separator F20BHE (manufactured by Toray Battery Separator Film Co., Ltd.), and dried in a hot air oven at 60° C. The composite membrane was then fixed to a metal frame, and introduced into a water bath at 60° C. to extract a solvent. Subsequently, the water-containing composite membrane taken out from the water bath was subjected to a heat treatment in a vacuum oven at a temperature of 80° C. for 15 minutes to obtain a composite-ion-permeable membrane sample having a total thickness of 24 µm.

In the obtained composite-ion-permeable membrane sample, the polymer-ion-permeable membrane alone had a puncture strength of 1.0 N/µm. The puncture strength (N/µm) per unit thickness of only the polymer-ion-permeable membrane was determined in the following manner: the puncture strength (N) of the PE separator alone was subtracted from the puncture strength (N) of the composite-ion-permeable membrane sample to determine the puncture strength (N) of only the polymer-ion-permeable membrane, and the determined puncture strength (N) was divided by the thickness (4 µm). The puncture strength of the composite-ion-permeable membrane sample was 0.4 N/µm. The porosity shown in Table 1 is a value obtained by measuring the porosities of the PE separator alone and the composite-ion-permeable membrane sample, and calculating therefrom the porosity of only the polymer-ion-permeable membrane.

It was impossible to measure the thermal shrinkage ratio at 200° C. because the sample was considerably shrunk.

Example 12

The same procedure as in Example 1 was carried out to produce a solution containing an aromatic polyamide (A).

The obtained aromatic polyamide solution was applied in the form of a membrane onto an active material-formed surface of a positive electrode sheet to be used in preparation of a battery evaluation cell, and was dried in a hot air oven at 80° C. The composite was then introduced into a water bath at 60° C. to extract a solvent, and then subjected to a heat treatment in a vacuum oven at a temperature of 80° C. for 15 minutes to obtain an electrode composite sample with a 5 μm-thick polymer-ion-permeable membrane formed on an electrode.

To determine the puncture strength, membrane resistance and porosity of the polymer-ion-permeable membrane alone in the electrode composite sample, a polymer-ion-permeable membrane alone was formed under the following conditions. First, a solution containing an aromatic polyamide solution (A) was applied in the form of a membrane onto a stainless steel plate as a support, and dried at a hot air temperature of 80° C. until the film had self-retainability, and the film was then separated from the support. The separated film was then fixed to a metal frame, and introduced into a water bath at 60° C. to extract a solvent. Subsequently, the water-containing film taken out from the water bath was subjected to a heat treatment in a vacuum oven at a temperature of 80° C. for 15 minutes to obtain a sample of a 5 μm-thick polymer-ion-permeable membrane alone. The obtained polymer-ion-permeable membrane alone had a puncture strength of 1.2 N/μm, a membrane resistance of 9.3 Ω·cm$^2$ and a porosity of 0%.

A battery evaluation cell with the obtained electrode composite sample facing a negative electrode was prepared, and evaluation was performed. The result showed that the battery had a capacity equivalent to 94% of the design capacity in finishing charge-discharge, and a power characteristic of 89% at 0.5 C, 79% at 1 C and 10% at 3 C.

Comparative Example 1

Except that to obtain an aromatic polyamide (F), the diamine was changed to 2-chloro-1,4-phenylenediamine (manufactured by Nippon Kayaku Co., Ltd.) in an amount of 80 mol % and 4,4'-diaminodiphenyl ether in an amount of 20 mol % based on the total amount of the diamine, the same procedure as in Example 1 was carried out to obtain a sample. The evaluation results for the obtained samples are shown in Tables 1 and 2.

Battery evaluation was performed using the obtained sample, and the result showed that the charge time exceeded 24 hours, and thus battery evaluation was impossible.

Comparative Example 2

Except that to obtain an aromatic polyamide (G), the diamine was changed to 1,3-phenylenediamine (manufactured by Tokyo Chemical Industry Co., Ltd.), and the acid chloride was changed to isophthaloyl chloride (manufactured by Tokyo Chemical Industry Co., Ltd.) in an amount of 100 mol % based on the total amount of the diamine, the same procedure as in Example 1 was carried out to obtain a sample. The evaluation results for the obtained samples are shown in Tables 1 and 2.

An affinity to lithium ions in terms of a free energy ΔG in the molecular structure of the aromatic polyamide (G) was calculated, and the result showed that carbonyl oxygen derived from isophthaloyl chloride had an affinity of −61.7 kcal/mol, and other sites had a value larger than −20 kcal/mol.

Comparative Example 3

Except that to obtain an aromatic polyamide (H), the diamine was changed to bis(3-aminophenyl)sulfone (manufactured by Tokyo Chemical Industry Co., Ltd.) in an amount of 100 mol % based on the total amount of the diamine, and the acid chloride was changed to terephthaloyl chloride in an amount of 99 mol % based on the total amount of the diamine, the same procedure as in Example 1 was carried out to obtain a sample. The evaluation results for the obtained samples are shown in Tables 1 and 2.

Comparative Example 4

Polyethylene oxide E-45 (manufactured by Meisei Chemical Works, Ltd.) was dissolved in acetonitrile (manufactured by Tokyo Chemical Industry Co., Ltd.) at 60° C. to obtain a solution in a concentration of 10% by mass.

The obtained polyethylene oxide solution was applied in the form of a membrane onto a stainless steel (SUS 316) plate as a support, and dried in a hot air oven at 80° C. until the film had self-retainability, and the film was then separated from the support. The separated film was fixed to a metal frame, and subjected to a heat treatment in a vacuum oven at a temperature of 100° C. for 12 hours to obtain a 5 μm-thick sample. The evaluation results for the obtained samples are shown in Tables 1 and 2.

It was impossible to measure the thermal shrinkage ratio at 150° C. and 200° C. because the sample was considerably shrunk.

TABLE 1

| | Membrane constituent material | Porosity (%) | Gurley gas permeability (seconds/100 ml) | Piercing strength (N/μm) | 5%-Elongation stress (MPa) MD | 5%-Elongation stress (MPa) TD | Fracture-point elongation (%) MD | Fracture-point elongation (%) TD |
|---|---|---|---|---|---|---|---|---|
| Example 1 | Aromatic polyamide (A) | 0 | No gas permeability | 1.6 | 120 | 132 | 68 | 55 |
| Example 2 | Aromatic polyamide (B) | 0 | No gas permeability | 1.5 | 264 | 273 | 51 | 48 |
| Example 3 | Aromatic polyamide (C) | 0 | No gas permeability | 1.5 | 117 | 126 | 62 | 53 |
| Example 4 | Aromatic polyamide (D) | 0 | No gas permeability | 1.4 | 105 | 101 | 42 | 39 |
| Example 5 | Aromatic polyamide (E) | 0 | No gas permeability | 1.2 | 87 | 75 | 107 | 102 |
| Example 6 | Aromatic polyamide acid (A) | 0 | No gas permeability | 1.3 | 92 | 88 | 74 | 60 |
| Example 7 | Aromatic polyimide (A) | 0 | No gas permeability | 0.9 | 121 | 128 | 25 | 18 |
| Example 8 | Aromatic polyamide (A)/PC | 0 | No gas permeability | 0.6 | 82 | 87 | 37 | 30 |
| Example 9 | Aromatic polyamide (A)/silica | 0 | No gas permeability | 1.4 | 136 | 140 | 17 | 15 |
| Example 10 | Aromatic polyamide (A) | 0 | No gas permeability | 1.5 | 49 | 53 | 20 | 18 |
| Example 11 | Aromatic polyamide (A)/alumina | 0 | No gas permeability | 1.0 | 62 | 73 | 98 | 84 |
| Example 12 | Aromatic polyamide (A) | 0 | — | 1.2 | — | — | — | — |
| Comparative Example 1 | Aromatic polyamide (F) | 0 | No gas permeability | 1.4 | 352 | 380 | 56 | 40 |

TABLE 1-continued

| | Membrane constituent material | Porosity (%) | Gurley gas permeability (seconds/100 ml) | Piercing strength (N/μm) | 5%-Elongation stress (MPa) MD | 5%-Elongation stress (MPa) TD | Fracture-point elongation (%) MD | Fracture-point elongation (%) TD |
|---|---|---|---|---|---|---|---|---|
| Comparative Example 2 | Aromatic polyamide (G) | 0 | No gas permeability | 1.1 | 91 | 92 | 108 | 106 |
| Comparative Example 3 | Aromatic polyamide (H) | 0 | No gas permeability | 1.4 | 251 | 251 | 27 | 21 |
| Comparative Example 4 | Polyethylene oxide | 0 | No gas permeability | 0.1 | 16 | 18 | 28 | 27 |

TABLE 2

| | Membrane constituent material | Thermal shrinkage ratio (%) at 150° C. MD | Thermal shrinkage ratio (%) at 150° C. TD | Thermal shrinkage ratio (%) at 200° C. MD | Thermal shrinkage ratio (%) at 200° C. TD | Membrane resistance (Ω·cm²) |
|---|---|---|---|---|---|---|
| Example 1 | Aromatic polyamide (A) | 0.0 | 0.0 | 0.0 | 0.0 | 9.9 |
| Example 2 | Aromatic polyamide (B) | 0.0 | 0.0 | 0.0 | 0.0 | 46.4 |
| Example 3 | Aromatic polyamide (C) | 0.0 | 0.0 | 0.0 | 0.0 | 11.2 |
| Example 4 | Aromatic polyamide (D) | 0.0 | 0.0 | 0.0 | 0.0 | 51.2 |
| Example 5 | Aromatic polyamide (E) | 0.0 | 0.0 | 0.0 | 0.0 | 11.7 |
| Example 6 | Aromatic polyamide acid (A) | 0.0 | 0.0 | 0.0 | 0.0 | 9.3 |
| Example 7 | Aromatic polyimide (A) | 0.0 | 0.0 | 0.0 | 0.0 | 22.4 |
| Example 8 | Aromatic polyamide (A)/PC | 0.0 | 0.0 | 0.0 | 0.1 | 8.0 |
| Example 9 | Aromatic polyamide (A)/silica | 0.0 | 0.0 | 0.0 | 0.0 | 6.9 |
| Example 10 | Aromatic polyamide (A) | 0.0 | 0.0 | 0.0 | 0.0 | 4.0 |
| Example 11 | Aromatic polyamide (A)/alumina | 1.0 | 1.2 | Measurement impossible | Measurement impossible | 6.7 |
| Example 12 | Aromatic polyamide (A) | 9.3 | — | — | — | 9.3 |
| Comparative Example 1 | Aromatic polyamide (F) | 0.0 | 0.0 | 0.0 | 0.0 | 17232 |
| Comparative Example 2 | Aromatic polyamide (G) | 0.0 | 0.0 | 0.0 | 0.0 | 10776 |
| Comparative Example 3 | Aromatic polyamide (H) | 0.0 | 0.0 | 0.0 | 0.0 | 15104 |
| Comparative Example 4 | Polyethylene oxide | Measurement impossible | Measurement impossible | Measurement impossible | Measurement impossible | 847 |

INDUSTRIAL APPLICABILITY

A polymer-ion-permeable membrane has substantially no pores, and includes a polymer containing an ion-conductive site. Accordingly, the polymer-ion-permeable membrane is excellent in heat resistance, strength, flexibility and ion permeability. Therefore, the polymer-ion-permeable membrane can be suitably used as a battery electrolyte membrane or the like. When the polymer-ion-permeable membrane is used as a battery electrolyte membrane, high properties are attained as properties of a battery because the electrolyte membrane is excellent in safety in respect to heat resistance, deformation/impact resistance, resistance to a short circuit caused by a dendrite and so on, has low resistance, and can be thinned.

The invention claimed is:

1. A polymer-ion-permeable membrane having a Gurley gas permeability of 10,000 seconds/100 ml or more, a puncture strength of 0.3 to 3.0 N/μm per unit thickness, and a membrane resistance of 3.0 to 100.0 Ω·cm² at 25° C., the membrane comprising a polymer containing a polymer having a structure of any one of chemical formulae (I) to (III):

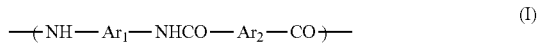

(I)

(II)

(III)

wherein 25 to 100 mol % of the total of all of the groups of $Ar_1$ and $Ar_2$ in the chemical formulae (I) to (III) is constituted of at least one selected from groups represented by chemical formulae (IV) to (VI):

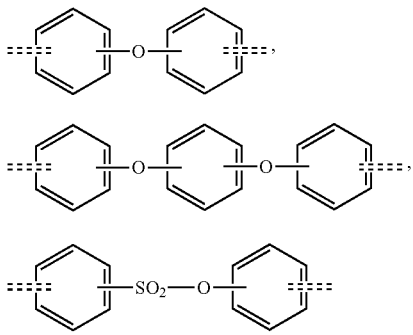

the double broken line in the chemical formulae (IV) to (VI) represents one or two bond(s), and having 1) substantially no pores and 2) ion permeability of at least one permeating ion species selected from the group consisting of metal elements belonging to Group 1 and Group 2.

2. The polymer-ion-permeable membrane according to claim 1, having a 5%-elongation stress of 40 to 1,000 MPa in each of a machine direction (MD) and a transverse direction (TD), and a fracture elongation of 5 to 200% in each of the machine direction (MD) and the transverse direction (TD).

3. The polymer-ion-permeable membrane according to claim 1, having a thermal shrinkage ratio of −2.0 to 10.0% at 150° C. in each of the machine direction (MD) and the transverse direction (TD).

4. The polymer-ion-permeable membrane according to claim 1, comprising a polymer containing a site with an affinity of −80 to −50 kcal/mol and a site with an affinity of −45 to −20 kcal/mol to lithium ions in terms of a free energy ΔG.

5. The polymer-ion-per useable membrane according to claim 1, comprising a polymer containing an aromatic polyamide, an aromatic polyimide or an aromatic polyamideimide having an ether bond or a thioether bond at a main chain or a side chain.

6. A composite-ion-permeable membrane in which the polymer-ion-permeable membrane according to claim 1 is formed on a base material having pores.

7. A battery electrolyte membrane obtained using the polymer-ion-permeable membrane according to claim 1.

8. An electrode composite in which the polymer-ion-permeable membrane according to claim 1 is formed on a battery electrode.

9. A battery electrolyte membrane obtained using a composite-ion-permeable membrane according to claim 6.

* * * * *

UNITED STATES PATENT AND TRADEMARK OFFICE
CERTIFICATE OF CORRECTION

PATENT NO. : 10,305,143 B2
APPLICATION NO. : 15/523803
DATED : May 28, 2019
INVENTOR(S) : Sawamoto et al.

Page 1 of 1

It is certified that error appears in the above-identified patent and that said Letters Patent is hereby corrected as shown below:

In the Claims

In Column 26, at Line 13, In Claim 5, please change "polymer-ion-per useable" to --polymer-ion-permeable--.

Signed and Sealed this
Twenty-second Day of October, 2019

Andrei Iancu
*Director of the United States Patent and Trademark Office*